Jan. 3, 1928.
B. E. PARRISH
OIL SAVER
Filed April 13, 1926  2 Sheets-Sheet 1
1,654,994
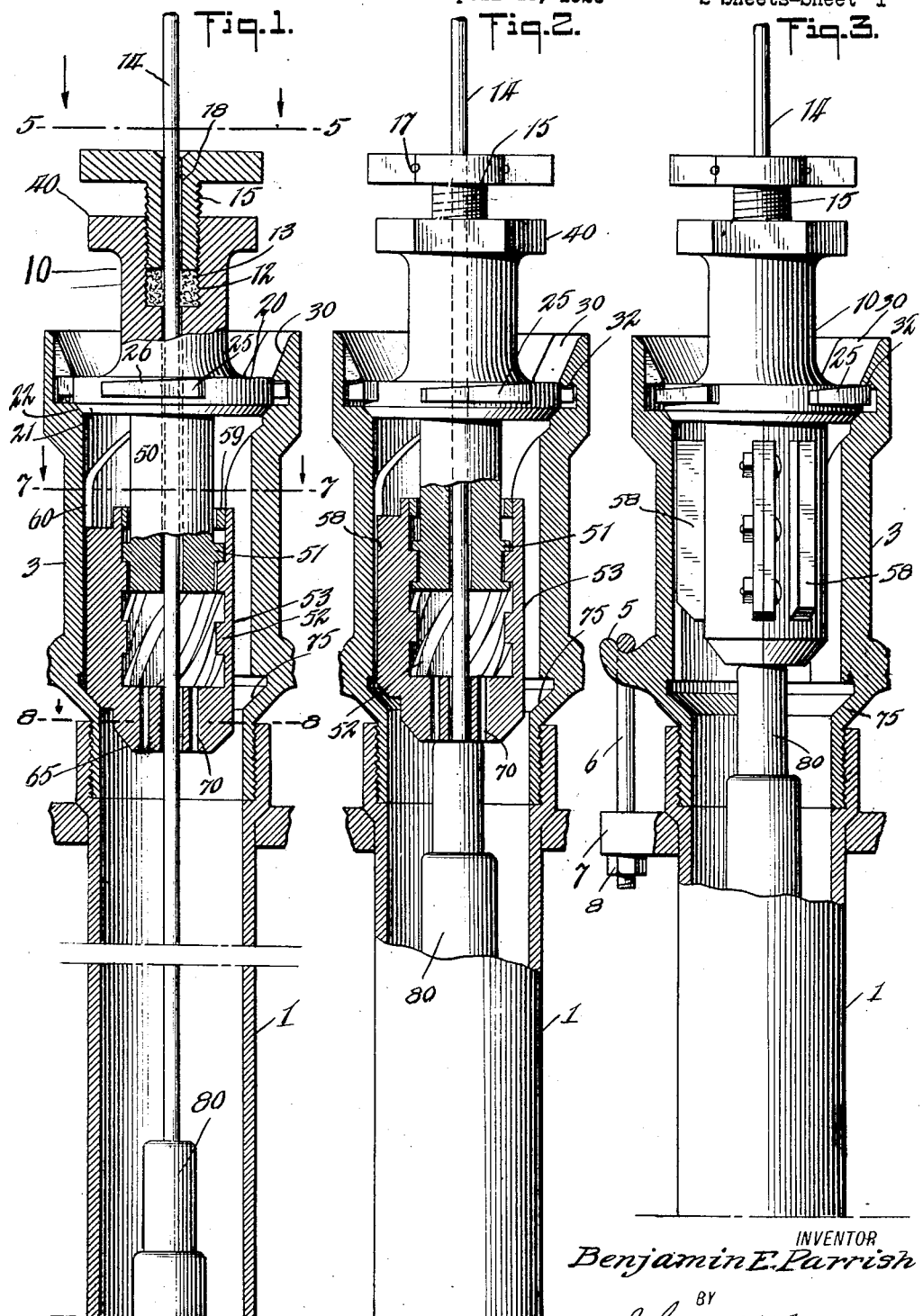
INVENTOR
Benjamin E. Parrish
BY
J. Granville Meyers
ATTORNEY Jan. 3, 1928.
B. E. PARRISH
1,654,994
OIL SAVER
Filed April 13, 1926
2 Sheets-Sheet 2
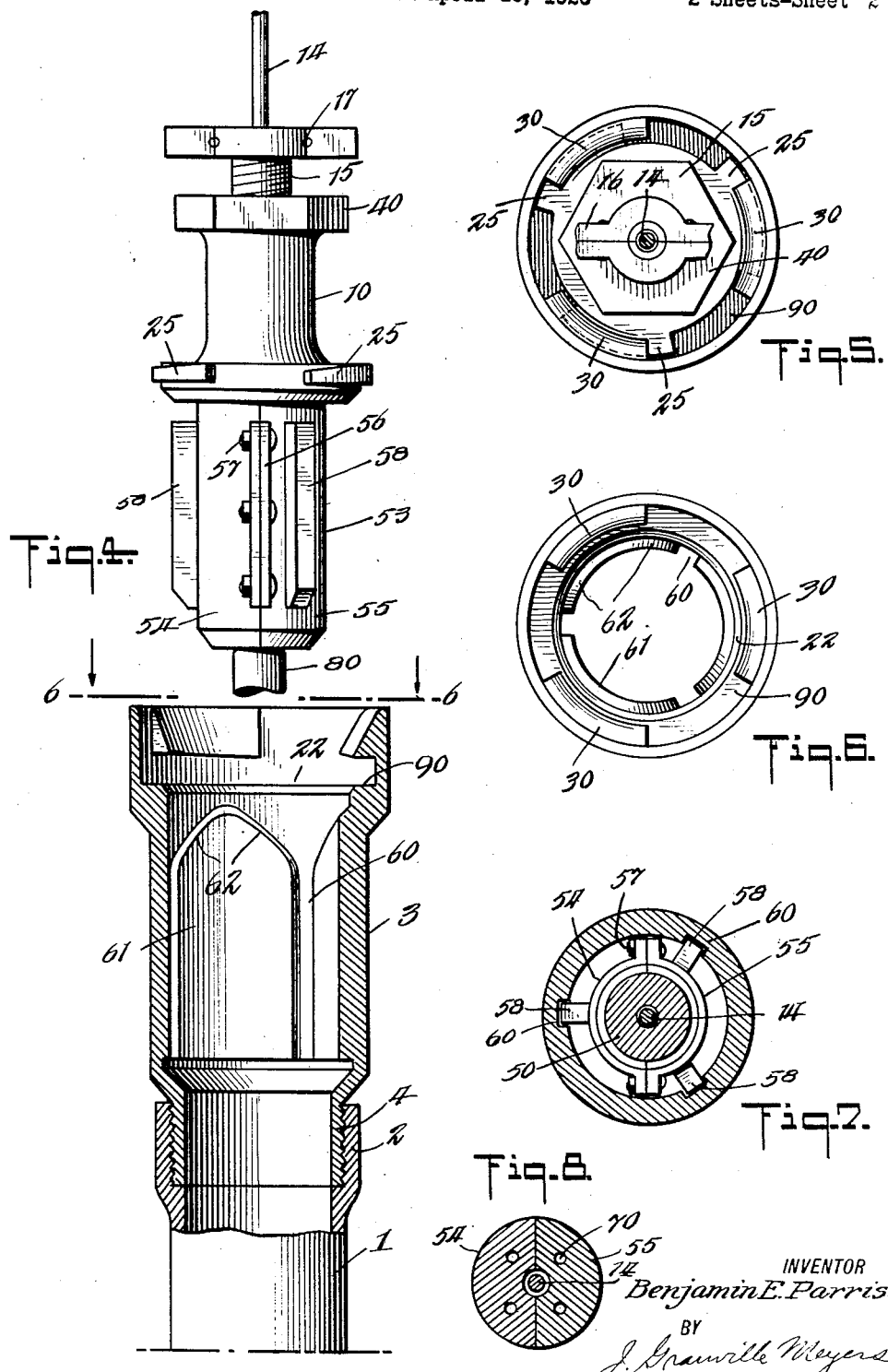
INVENTOR
*Benjamin E. Parrish*
BY
*J. Granville Meyers*
ATTORNEY Patented Jan. 3, 1928.

1,654,994

UNITED STATES PATENT OFFICE.

BENJAMIN EUGENE PARRISH, OF HONEY GROVE, TEXAS, ASSIGNOR OF ONE-THIRD TO DARWIN W. MAURER, OF DALLAS, TEXAS, AND ONE-THIRD TO NOLAN S. von PHUL, OF TAMPICO, MEXICO.

OIL SAVER.

Application filed April 13, 1926. Serial No. 101,721.

My invention relates to improvements in devices of the class known in the oil and gas well arts, as oil savers, or devices adapted for closing the well or well casing to prevent undesired escape or flow of oil, gas or other fluid.

The general object of the invention is to provide a device of simple and economical structure but which is strong and durable, is easily inserted and locked in position to provide a tight closure, and more especially, is adapted for automatic unlocking or release and complete removal from the well or casing by co-operation with the drilling tool or its chuck, without requiring any releasing manipulation by the attendant. Heretofore manipulation of these devices has been very dangerous and has resulted in many accidents and fatalities, for reasons well known to persons skilled in these arts.

The characteristics and advantages of the invention are further sufficiently explained in connection with the following detail description of the accompanying drawing, which shows one representative embodiment of the invention. After considering this example, skilled persons will understand that many variations may be made, and I contemplate the employment of any structures that are properly within the scope of the appended claims.

Fig. 1 is a view mainly in longitudinal section of an appliance embodying the invention in one form.

Fig. 2 is a similar view showing the parts in another position.

Fig. 3 shows still another position.

Fig. 4 shows the valve member and nut completely removed from the outer shell or body and suspended on the drilling line by engagement with the tool or chuck.

Fig. 5 is a section at 5—5, Fig. 1.

Fig. 6 is a plan view at 6—6, Fig. 4.

Fig. 7 is a section at 7—7, Fig. 1.

Fig. 8 is a section at 8—8, Fig. 1.

The appliance may be placed on a well casing or similar well lining or extension of the same. More particularly, it may be secured to the control valve or blow-off T above the control valve. In the drawings, 1 is the upper end of a pipe which may be any of the above mentioned tubular formations and is provided with an internal screw thread 2.

The oil saver proper includes a main shell or body 3, the lower end of which is formed with an external screw thread 4 to screw into the thread 2 of the pipe member 1, and if desired this shell may be additionally locked in position by providing it with ears 5 which may be clamped on the pipe member 1 by bolts 6, a collar 7 and nuts 8, or any equivalent arrangement.

Cooperating with the shell 3 is a head 10 which may otherwise be identified as a cap or sealing member. The upper portion 11 is formed to provide a stuffing box 12, Fig. 1, in which packing 13 is inserted to form a seal about the line 14. The packing is compressed by a split gland 15 having a nut or handle formation 16. The stem of this gland is screw threaded to enter the stuffing box and properly compress the packing, and the two halves are secured together by screws or rivets 17. The two parts of the gland when put together are formed to provide a bore 18 to slidingly fit the line.

The cap is formed with a disc-like enlargement 20, the lower face of which is beveled and ground to provide a valve surface 21 to co-operate with a similarly formed seat 22 near the upper end of the shell. On the periphery of the seal or valve portion are a plurality of lugs 25, conveniently three of them as shown, in spaced relation. The upper or outward faces 26 of these lugs are slightly beveled or tapered so that they have a lead like a screw thread or the male member of a bayonet joint. These lugs co-operate with lugs 30 formed in the upper end of the shell, of number and spacing similar to the lugs 25. The inward faces of the lugs 30 are beveled on conical contours, and their end faces 32 may be beveled to correspond with the bevel or taper of lug surfaces 26. The lugs 30 are separated by cylindrically formed portions of the upper bore of the shell to permit the lugs 25 to pass between them by axial movement of the cap member. Preferably, the upper end of the cap structure is formed as a nut 40, so that the cap may be securely locked in position by application of a wrench.

Below the disc portion 20 the cap structure has a cylindrical extension 50, the lower portion of which is formed with multiple screw threads 51 of substantial cross section and steep pitch to co-operate with similar threads 52 formed in a nut structure 53. This nut is made in two halves, which may be substantial duplicates, 54 and 55, except as noted below. Each part is formed with ears 56 for the clamping together of the halves about the screw 51 by bolts or rivets 57. The flanges 56 are dimensioned to clear the interior formation of the shell, as clearly shown in Fig. 7. The two halves also have wider flanges 58. When these flanges are designed to co-operate with shell formations provided in triplicate, as in the present specific example, one of the flanges 58 is on one of the nut members as 54, and two of them are on the other nut member, as 55, to provide for the necessary 120° spacing of the flanges; otherwise the nut members may be identical; or, of course, four equally spaced flanges may be provided to co-operate with suitably arranged formations in the shell and then the nut halves may be identical.

At the upper ends of the bores of the two nut members are shallow internal flanges or half collars 59 which serve as stops to prevent the nut dropping off of the screw or its supporting stem 50.

The inner surface of the shell throughout the range of nut movement is provided with longitudinal channels 60 to slidingly receive the flanges 58. The upper ends of the "lands" 61 between the channels are convergently beveled as at 62 to provide for easy entry of the flanges 58 into respective channels 60.

Desirably, the interior formation of the casing is such that it expands in steps upward, and the cap structure and nut are reciprocally formed, that is to say, the lower end of the nut, as at 65, is smaller than the overall diameter of flanges 58, and the flanges are within the limits of the valve face 21, so that the entire device may be easily inserted downwardly into the shell without encountering any obstructions.

To prevent any undesired upward displacement of the nut by interior pressure its lower end is provided with one or more perforations 70, so that any pressure applied below the nut is equalized by reason of these holes communicating with its interior.

Fig. 1 shows the appliance in operative position and locked. The tool or tool chuck 80 is suspended on the line below the nut. Valve face 21 is firmly seated on its seat 22 having been forcibly turned by a wrench or otherwise, so that the valve member is clamped tight down by the wedging action of the beveled faces 26 of lugs 25 cooperating with the similarly formed under faces of lugs 30. The nut structure has its flanges 58 located in the vertical slots 60 which prevent rotation of the nut. The nut is also supported either by engagement of the lower ends of the flanges with an interior formation 75 of the shell, or by engagement of collar members 59 with the upper ends of the nut thread 51, The upper end of the well tube or blow-off T 1 is now positively sealed and drilling may be proceeded with as usual. When it is desired to withdraw the drilling tool or to unseal the tube 1 for any other reason, this is automatically effected merely by hoisting the tool until its upper end or the upper end of chuck 80 strikes the bottom of the nut 53. The nut is then moved upward without rotation because of engagement of its flanges 58 in channels 60. The internal and external screw threads 52 and 51 respectively act upon each other to cause rotation of stem 50 and the entire cap structure. The lugs 25 are thus withdrawn by rotative movement from engagement with the under faces of lugs 30. This rotation continues in the present example for one-third of a turn and then the longer vertical faces 25ᵃ of lugs 25 strike the vertical end faces of lugs 30 and at the same moment the lugs 25 are located in the cylindrical portions of the shell bore. The continued upward movement of the tool or chuck 80 then carries the cap structure and of course, the nut, also, bodily up out of the structure, leaving the shell and the tube 1 to which it is connected, unobstructed and free for the passage of oil or other liquid or gas, and without the necessity of an attendant going near the upper end of the shell to perform any releasing operation.

The cap and nut structures are now located on the line and suspended above the shell by engagement with the upper end of the tool or chuck 80, as shown in Fig. 4, ready for reinsertion. To accomplish this, it is only necessary to again lower the tool or chuck 80 into the shell and tube 1. As the nut descends, its flanges 58 are directed automatically by the angular formations 62 into the channels 60. Until these flanges engage in the channels the nut is free to rotate or the cap structure may rotate in relation to the nut. This will be accomplished either automatically or by a slight rotative movement imparted to nut 40 by the attendant so that lugs 25 pass down through the cylindrical formations of the shell between lugs 30 and finally rest on the flat annulus 90 surrounding valve seat 22. The cap is then locked by application of a wrench to nut 40, about one-third of a turn sufficing to bring angular faces 26 in full engagement with the angular under faces of lugs 30 to wedge the valve face 21 into tight engagement with its seat 22 and the device is then locked, effectively sealing the shell and tube 1, but ready for another automatic releasing action at any time, in the manner above described.

I claim:—

1. An appliance of the class described comprising a shell, a cap having a sealing formation to co-operate with a sealing formation in the shell, means for interlocking the cap with the shell, and means acting automatically upon upward movement of a tool or chuck to rotate and disconnect the cap from the shell and place it in free position for withdrawal.

2. An appliance of the class described comprising a shell, a cap having a sealing formation to co-operate with a sealing formation in the shell, means for interlocking the cap with the shell, and means acting automatically upon upward movement of a tool or chuck to rotate and disconnect the cap from the shell and place it in free position for withdrawal, the continued upward movement of the tool or chuck serving then to withdraw and elevate the cap.

3. An appliance of the class described comprising a shell having a valve seat, spaced locking lugs adjacent the seat, and guides for a nut structure, a cap structure having spaced locking lugs to co-operate with the shell lugs, a valve formation to co-operate with the valve seat, and a screw, and a nut structure co-operating with the screw and with the shell guide formations whereby the cap may be locked in position by rotation and automatically released by co-operation of the nut and screw when the nut is engaged by an upward moving tool or chuck.

4. An appliance of the class described comprising a shell having a valve seat, and thereabove spaced locking lugs, the shell also having vertical channels with upper tapered guide formations, a cap structure including a valve to co-operate with the seat, spaced locking lugs designed to pass longitudinally between the shell lugs and to interlock with them by rotation to force the valve upon the seat, a nut having screw connection with the cap and also having flanges cooperating with the shell guide formations and channels, the structure being adapted by engagement with the nut of an ascending tool or chuck to automatically cause unlocking of the cap by axial movement of the irrevoluble nut in co-operation with the cap screw formation.

5. An appliance of the class described comprising a shell having a valve seat, and thereabove spaced locking lugs having beveled under faces, the shell also having vertical channels with upper tapered guide formations, a cap structure including a valve to co-operate with the seat, spaced locking lugs having beveled upper faces and designed to pass longitudinally between the shell lugs and to interlock with them by rotation to force the valve upon the seat, a nut having screw connection with the cap and also having flanges co-operating with the shell guide formations and channels, the structure being adapted by engagement with the nut of an ascending tool or chuck to automatically cause unlocking of the cap by axial movement of the irrevoluble nut in co-operation with the cap screw formation.

6. An oil saver or similar structure comprising a shell adapted for connection to a tubular well casing or similar appliance, the shell having near its upper end a valve seat and spaced locking lugs, and also having therebelow vertical guide channels with the tapered guide formations, a cap structure bored to accommodate a drilling line and having a valve formation and spaced locking lugs to co-operate with the shell lugs by rotary action, and a split nut structure secured about the lower extension of the cap, said extension and the nut having co-operating steep pitch screw threads and the nut having flanges engaging in the shell guide channels, the described structure acting to seal the upper end of the casing by rotary movement of the cap and co-operation of the cap and shell lugs, and also for automatic release and removal by upward movement of a tool or chuck suspended on the drill line and engaging the lower end of the nut, which then unlocks the cap by straight line movement and rotation of the cap by the screw thread action.

Signed at Tampico, Tamaulipas, Mexico, this 19th day of March A. D. 1926.

BENJAMIN EUGENE PARRISH.